United States Patent [19]
Bähr et al.

[11] Patent Number: 4,634,059
[45] Date of Patent: Jan. 6, 1987

[54] METHOD AND DEVICE FOR EMPTYING SUSPENSION FROM A PULPER

[75] Inventors: Theodor Bähr; Helmut Thumm; Walter Musselmann, all of Heidenheim, Fed. Rep. of Germany

[73] Assignee: J. M. Voith GmbH, Fed. Rep. of Germany

[21] Appl. No.: 591,870

[22] Filed: Mar. 21, 1984

[30] Foreign Application Priority Data

Mar. 26, 1983 [DE] Fed. Rep. of Germany ....... 3311082

[51] Int. Cl.$^4$ .............................................. B02C 23/38
[52] U.S. Cl. ................................ 241/46 B; 241/46.17; 241/79; 241/80; 241/97
[58] Field of Search ................ 241/46 B, 46.02, 46.08, 241/46.11, 46.17, 79, 80, 97, 152 R, 152 A

[56] References Cited

U.S. PATENT DOCUMENTS 3,653,807  4/1972  Platt .............................. 241/46.02 X
4,231,526  11/1980  Ortner et al. ................. 241/46.17 X

FOREIGN PATENT DOCUMENTS 2547896  10/1975  Fed. Rep. of Germany .

OTHER PUBLICATIONS

Heinsockel and U. Mueller, "The Escher Wyss Fiberizer in a Waste Paper Stack Preparation Ore", 3/12/74.

Primary Examiner—Mark Rosenbaum
Assistant Examiner—Timothy V. Eley
Attorney, Agent, or Firm—Ostrolenk, Faber, Gerb & Soffen

[57] ABSTRACT

In a pulping apparatus including a pulper with a rotor near the bottom therein, the pulper having a sluice outlet at the bottom for acceptable pulp suspension. Above the rotor at a corner of the pulper is a second outlet for suspension and dirt. A conduit leads from the second outlet to a horizontally oriented withdrawal apparatus chamber having a suspension agitating rotor at the end of the chamber opposite the entrance for pulp thereinto. A tangential outlet from the withdrawal apparatus chamber leads to a rotary, perforated sorting drum which permits exit of acceptable suspension and which has a rejected suspension and dirt outlet. A valve in the inlet to the withdrawal apparatus chamber is periodically and cyclically opened to permit periodic replacement of the suspension in the withdrawal apparatus chamber, and the suspension which has been agitated in the withdrawal apparatus chamber then moves to the sorting drum.

12 Claims, 1 Drawing Figure

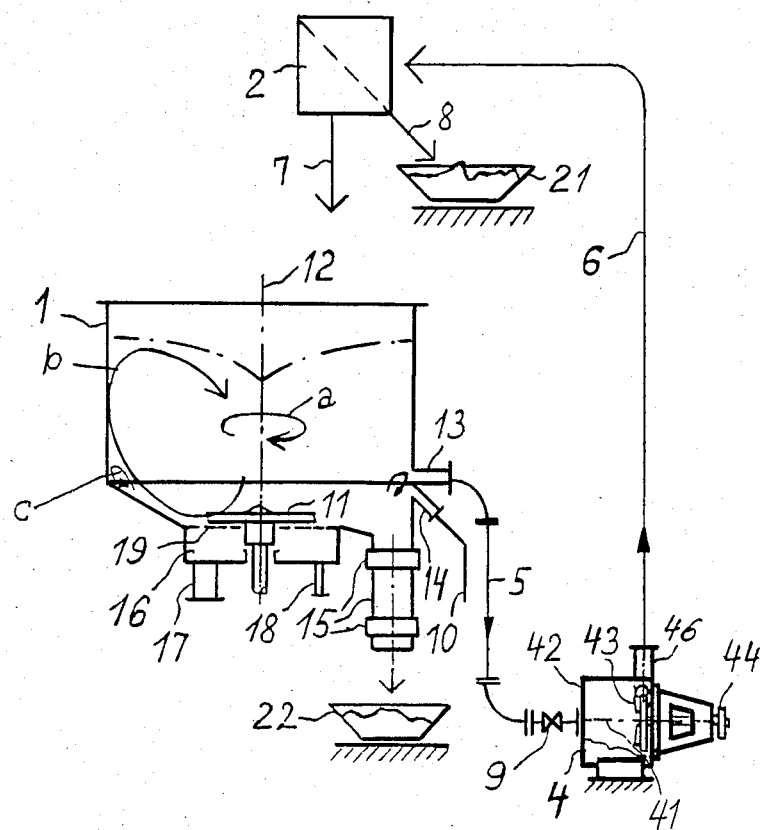

METHOD AND DEVICE FOR EMPTYING SUSPENSION FROM A PULPER

BACKGROUND OF THE INVENTION

The present invention relates to a method of emptying suspension from a pulper of paper and the like material and to a device for this purpose.

Such a method is already known from German Patent Application DE-OS No. 29 41 439. In this method, the suspension is removed from the pulper, agitated and is diluted or washed in a subsequent suspension withdrawal apparatus. The dirt contained in the suspension which had been withdrawn from the pulper 1 separates from the other components of the suspension particularly, the fibers. The dirt remains by itself, in addition to the water. The dirt is then removed from the withdrawal apparatus by a separate line. The cleaned pulp suspension is eventually redelivered to the pulper. This method, however, is not performed successfully. A large part of the dirt is broken up, particularly in the withdrawal apparatus, to such an extent that it passes back into the pulper together with the acceptable pulp fibers. This dirt is so broken up that it can only be removed later and very poorly, as it is now possible that this finely divided dirt will no longer clog the screen of the pulper. This dirt must be removed later, which is quite difficult.

SUMMARY OF THE INVENTION AND DESCRIPTION OF THE DRAWING

It is the object of the invention to remove dirt from pulp suspension, which has been withdrawn from a pulper, the dirt removal being at an early stage and without difficulty.

Another object of the invention is to avoid breaking up dirt in the suspension withdrawn from the pulper.

The present invention relates both to a method of emptying pulp suspension from a pulper and to apparatus which performs this method.

Pulpable material, such as waste paper, is pulped in a conventional pulper with a chamber having a horizontally oriented rotor located toward its bottom and in which pulpable material, pulping chemicals, diluting water, etc. are introduced. Rotation of the rotor pulps the paper. Because waste paper is being pulped, there is various dirt and other materials in the paper which are found in the pulp suspension and are to be removed according to the invention. The pulper has one sluice outlet at its bottom for removal of cleaned pulp suspension. Dirty suspension is removed from the pulper through a second outlet which is slightly above the bottom and also above the rotor.

That second outlet communicates into a withdrawal apparatus which includes a housing that is shaped like a body of rotation and which is oriented with a horizontal axis. Inlet to that housing is at one end and centrally thereof. A vertically oriented rotor is located toward the opposite end of the withdrawal apparatus housing. The rotor is designed to stir the material in the withdrawal apparatus housing, but not to further break up any dirt that has been withdrawn from the pulper. There is a tangential outlet from the withdrawal apparatus housing generally in the region of the rotor, and the rotor helps stirred material to pass through that outlet.

Appropriate valve means in at least one of the inlet to the withdrawal apparatus and the outlet therefrom is periodically and cyclically opened and closed to simultaneously permit entrance of new suspension into the withdrawal apparatus while permitting removal of stirred suspension from the withdrawal apparatus. The suspension dwells in the withdrawal apparatus sufficiently to stir the same up and to help separate dirt from the suspension. The period of time during which the suspension remains in the withdrawal apparatus housing is selected for desirably establishing the despecking and disintegrating of suspension within the withdrawal apparatus.

Suspension exiting from the withdrawal apparatus moves into a suspension sorting apparatus, such as a sorting drum, which separates acceptable suspension that passes through the perforated drum and sends dirt and unacceptable portions of the suspension to a reject outlet. The acceptable suspension exiting from the sorting apparatus may be returned to the pulper for recycling.

For helping the stirring in the withdrawal apparatus and to prevent blockage of the pulp suspension leaving the pulper outlet, dilution water may be introduced into the suspension at the outlet from the pulper.

Other objects and features of the invention will be explained below with reference to the FIGURE of the accompanying drawing which schematically shows an embodiment of the invention.

DESCRIPTION OF A PREFERRED EMBODIMENT

The pulper 1, with which the invention is employed, is designed to pulp waste paper with a relatively high solids consistency of, for instance, 8–16% by weight. The pulping is done by the eddy flow b produced by the rotor 11 at the bottom of the pulper chamber. The eddy flow has an axis of rotation 12 and the pulp rotates in the direction a. Eddies are produced in the corners of the pulper at c so that particles of dirt collect there in the corners of the pulper.

The rotor 11 rotates parallel to and above a screen 19 which separates a pulp removal space 16 from the rest of the contents of the container of the pulper 1. The pulped suspension is removed from this removal space 16 through the connection 17. Dilution water can furthermore be fed for this purpose through a connection 18.

There is a withdrawal connection 13 from the pulper in the vicinity of the bottom of and on the side of the container generally at the corner c. Via the line 5 connected to the connection 13, suspension is periodically fed from the pulper to the withdrawal apparatus 4 upon the periodic opening of the valve 9 in the line 5. A shut-off slide or valve (not shown) can also or alternatively be provided in the outlet or conveying line 6.

The withdrawal apparatus 4 is developed as a chamber with substantially rotational symmetry with the axis of rotation 41. It is shown oriented with its axis horizontal. A rotor 43 of the withdrawal apparatus 4 has an axis of rotation which is aligned with the axis of rotational symmetry 41. The line 5 is connected to the inlet end 42 of the withdrawal apparatus 4. The rotor is away from the inlet end 42 and at the opposite end wall of the apparatus 4. The rotor is driven via a pulley 44 by a motor, not shown.

The withdrawn suspension remains within the withdrawal apparatus 4 to be agitated by the rotor 43 for a period of time which is sufficient to considerably reduce the size of the scraps of waste paper and specks which are still contained in the suspension. The valve 9 is then again briefly opened, which admits new suspension from the pulper 1 through the line 5. At the same time, the rotor 43 of the withdrawal apparatus 4 conveys suspension in the apparatus 4 out through the tangential outlet 46. The rotor 43 is preferably located directly at the tangential outlet 46 so as to provide a good pumping-off action.

Thus, by proper positioning of the outlet 46, an inherent pumping-off action is provided in the withdrawal apparatus 4. No additional pump is required to move the suspension through the withdrawal apparatus, and, thus, no such additional pump is shown in conduits 5 or 6 in the drawing FIGURE. From the outlet 46, suspension moves through the conveying line 6 to the sorting apparatus 2. Upon the pumping-off, the new suspension to be fed is conducted through the line 5 centrally into the eye of the eddy of the flow in the withdrawal apparatus 4.

The sorting apparatus 2 is a perforated drum which rotates around a horizontal axis. The suspension is fed into the drum at one end. Such a screen drum is known, for instance, from German Provisional Patent DE-AS No. 25 47 896. Sorting devices 2 other than a sorting drum can also be used, for instance, a vibratory sorter.

The method of the invention has the advantage that it permits a sufficient separation of the dirt from the fiber components to take place in the sorting apparatus 2. On the other hand, the withdrawn dirt is not broken up to any great extent in the withdrawal apparatus 4. One reason for this is that the dwell time of the suspension in the apparatus 4 is not selected to be too long. Another reason is that no special cutting or separating devices are present. The acceptable suspension obtained at the sorting apparatus 2 and fed through its screen are fed via line 7 directly back into the pulper 1, while the rejects from apparatus 2 are discharged via line 8 into the collection container 21.

The removal of the portion of heavy dirt mainly occurs preferably in the pulper 1 through the heavy dirt sluice 15 and into the receiving container 22. A corresponding heavy dirt sluice, not shown, may be provided at the withdrawal apparatus 4.

In order to keep the entrance from the pulper into the withdrawal connection 13 open and to wash the fibers free of dirt as far as possible, dilution water may be fed into the region of the pulper where the withdrawal connection 13 is connected. Dilution water is fed through the connection 14 from the line 10 connected to it. Due also to the reduced suspension consistency at the connection 13, easy discharge of the suspension into and later out of the withdrawal apparatus 4 is assured. This dilution water can also be used to adjust the pulp consistency necessary for the pulping of the waste paper within the pulper 1.

The capacity of the withdrawal apparatus is substantially less than that of the pulper 1. The dwell time of the suspension in the withdrawal apparatus 4 may, in general, be between 30 seconds and 5 minutes. But, it is preferably 3 minutes. The open time of the shut-off member 9 is in general between about 3 and 5 seconds. This is advisedly arranged so that the best possible, i.e. most extensive, replacement of the suspension already worked in the withdrawal apparatus 4 by fresh suspension fed from the pulper 1 can take place.

Although the present invention has been described in connection with a preferred embodiment thereof, many variations and modifications will now become apparent to those skilled in the art. It is preferred, thereof, that the present invention be limited not by the specific disclosure herein, but only by the appended claims.

What is claimed is:

1. Apparatus for emptying pulp suspension from a pulper, comprising:
  a pulper including a pulping chamber in which pulping is to be performed, and pulping means in the pulping chamber for pulping material into a pulp suspension; the pulping chamber having a bottom;
  a suspension withdrawal outlet from the pulper near the bottom of the pulping chamber;
  a withdrawal apparatus including a withdrawal apparatus chamber therein, a rotor within said withdrawal apparatus chamber, a suspension conveying inlet and a suspension conveying outlet; said suspension conveying inlet communicating with the suspension withdrawal outlet from the pulper for feeding suspension into the withdrawal apparatus chamber for agitating suspension in that chamber; said suspension conveying outlet being located sufficiently near said rotor such that said rotor provides a pumping-off action for suspension flowing through said suspension conveying outlet;
  a sorting apparatus for removing dirt from said suspension; an inlet to the sorting apparatus connected to the conveying outlet to convey the suspension from the withdrawal apparatus chamber to the sorting apparatus; the sorting apparatus also having a first outlet to deliver suspension that has been freed of dirt; and
  means for periodically cyclically permitting simultaneous suspension flow from the pulper to the withdrawal apparatus and from the withdrawal apparatus to the sorting apparatus and for simultaneously halting both such flows.

2. The apparatus of claim 1, wherein the conveying outlet from the withdrawal apparatus is located directly adjacent the rotor in the withdrawal apparatus housing.

3. The apparatus of claim 1, wherein the withdrawal apparatus chamber has a shape of rotational symmetry and the rotor thereof is on the axis of such symmetry.

4. The apparatus of claim 3, wherein the axis of symmetry is generally horizontal.

5. The apparatus of claim 4, wherein the conveying outlet from the withdrawal apparatus is located directly adjacent the rotor in the withdrawal apparatus housing.

6. The apparatus of claim 1, wherein the means for halting both flows to and from the withdrawal apparatus comprises a valve in the inlet to the withdrawal apparatus chamber.

7. The apparatus of claim 1, wherein the sorting apparatus comprises a perforated screen drum which is rotatable around a substantially horizontal axis; the sorting apparatus inlet being at one end of the drum; a second outlet from the drum at the opposite end thereof for discharge of rejects therethrough.

8. The apparatus of claim 1, further comprising a dilution water line connected into the pulper in the region of the suspension withdrawal outlet.

9. Apparatus for emptying pulp suspension from a pulper, comprising:
  a pulper including a pulping chamber in which pulping is to be performed, and pulping means in the pulping chamber for pulping material into a pulp suspension; a first outlet from the pulper for accepted pulp suspension;

a withdrawal apparatus including a withdrawal apparatus chamber therein; an inlet to the withdrawal apparatus chamber communicating with the suspension withdrawal outlet from the pulper for feeding suspension into the withdrawal apparatus chamber; the withdrawal apparatus chamber being substantially cylindrical, and the inlet to the withdrawal apparatus chamber debauching centralling into that chamber;

a suspension conveying outlet from the withdrawal apparatus chamber; the suspension conveying outlet being tangential to that chamber;

a rotor in the withdrawal apparatus for agitating suspension in that chamber; said rotor being located toward the end of the chamber remote from the inlet into that chamber;

said suspension conveying outlet being located sufficiently near said rotor such that said rotor provides a pumping-off action for suspension flowing through said suspension conveying outlet.

10. The apparatus of claim 9, wherein the outlet for the withdrawal apparatus chamber is located directly adjacent the rotor.

11. The apparatus of claim 9, having a suspension flow shut-off in, selectively, the inlet to the withdrawal apparatus chamber or the outlet therefrom.

12. The apparatus of claim 9, further comprising a sluice outlet at the bottom of the pulper for exit of heavy dirt from the pulper; the second suspension withdrawal outlet being directly above the sluice outlet from the pulper.

* * * * *